United States Patent Office 3,681,251
Patented Aug. 1, 1972

3,681,251
PAINT REMOVAL FORMULATION
Charles R. W. Morison, South Clearwater, Fla., assignor to Union Carbide Corporation, New York, N.Y.
No Drawing. Filed Aug. 17, 1970, Ser. No. 64,568
Int. Cl. C09d 9/00
U.S. Cl. 252—162                                    7 Claims

ABSTRACT OF THE DISCLOSURE

A paint remover composition comprising a methylene chloride-methanol solvent, a quaternary nitrogen containing cellulose ether, and a compound selected from the group consisting of calcium oxide, sodium hydroxide, monoethanolamine, chromium sulfate, copper chloride, sodium metasilicate, barium chloride, lithium sulfate, lithium chloride, and sodium chloride.

---

This invention relates to compositions or formulation used for the removal of paints, coatings and finishes.

At the present time, in addition to the well known shellacs, varnishes, natural resins and gums, there exists a variety of other surface coating formulations such as lacquers formed from nitro-cellulose, cellulose esters; synthetics such as vinyl-type resins and acrylics; linseed oil paints; alkyd resins; and others.

In spite of continued improvement throughout the years in the quality of surface coatings, the coatings do deteriorate with time. The effect of nature's elements such as wind, sun and rain takes its toll, and frequently this toll is hastened by a side effect induced by man-made products injurious to the artistic appeal of the coatings. Those coatings which are not exposed to wind, sun and rain become unsightly with time and, hence, also lose aesthetic appeal. While frequently it is possible and desirable to lay down a fresh coat over the old, in many cases the old coat must be removed before a suitable resurfacing layer can be satisfactorily applied. In view of the wide variety of surface coating formulations now available, the art has attempted to provide an equally large number of surface coating removing formulations. Basically, the ingredients contained in a formulation useful for the removal of the above surface coating materials usually comprise (a) an active organic solvent, including binary, tertiary, etc., and mixtures thereof, (b) a viscosity thickener, and (c) an evaporation retardant or film-forming compound. Commercial removal formulations also may include one or more of the following ingredients such as activator, emulsifying agent, water, wetting agent and the like. The function of the active organic solvent is to loosen the surface coating or film so that it can be easily removed from the surface, whereas the viscosity thickener is added to provide sufficient viscosity to the removal formulation to meet the particular requirements at hand. For example, the removal of a coating from a vertical surface would dictate a removal formulation which possesses sufficient viscosity such that the formulation will not drain or "run" before the solvent has had a chance to penetrate the surface coating layer. Also, the viscosity of the removal formulation oftentimes will be varied according to the technique or equipment which will be employed to remove the surface coating, for example, brushing, rolling, spraying, and the like. The function of the evaporation retardant is indicated by its name. When a coating removal formulation is applied to the surface to be treated, evaporation of a minor portion of the active organic solvent generally will occur resulting in the formation of a thin waxy coating over the remover composition. The evaporation retardants or "film forming compounds" as they are otherwise known, are added to the composition to repress evaporation of the solvent until it has had an opportunity to act.

Of the several types of surface coating removers on the market today, the most widely used are those based upon methylene chloride as the solvent. This solvent has the most pronounced effect upon the widest range of surface coatings in use at the present time. Unfortunately, however, methylene chloride is relatively expensive when compared to less effective removers in general. Methanol, for example, is much less expensive. However, methanol is greatly inferior in its ability to remove surface coatings than methylene chloride. Advantageously however, methanol can serve as a cheapening diluent for methylene chloride without impairing noticeably the ability of methylene chloride to remove the surface coating. There is, however, a limit as to the amount of methanol which can be employed and this limit is determined in part by the effect the methanol has on various thickening agents. For example, when employing the popular methyl cellulose as a thickener for the removal composition, the methanol must be used in relatively small quantities, for otherwise the methyl cellulose would be precipitated from soution, and the whole paint remover then becomes unsuitable.

In my copending application Ser. No. 732843, filed May 29, 1968 and entitled "Paint Removal Formulation," now U.S. Pat. 3,600,322, I disclosed a paint remover composition which contained methylene chloride, methanol, and a specific type quaternary nitrogen containing cellulose ether. In that application I disclose that while the specific hydroxyethyl cellulose ethers described therein are not soluble in, or swollen by either methylene chloride, or methanol alone, certain combinations of the two will act as severe swelling and solvating agents for the resins. As little as one percent of the cellulose ethers suspended in the proper mixture expand sufficiently to form a thin slush. Such a slush can be used effectively as a paint remover, since by this solvating action the rheological properties are altered by the presence of the cellulose ethers in such a way that the remover can be applied in layers of suitable thickness to vertical, horizontal or angle surfaces without dripping. Unfortunately however the cost of these cellulose ethers has made their utilization not entirely attractive from a practical commercial standpoint. I have found that certain compounds as hereinafter described when added either as aqueous solutions or as solids in relatively small amount, have the ability to either thicken a methylene chloride, methanol, cellulose ether system substantially or to convert it into a useful gel. This, of course, means that a more substantial product can be obtained at a given concentration of cellulose ethers such as one or two percent or that a product equivalent in viscosity rating and consistency to that system can be formed with substantially low concentration of the cellulose ether resins. This would result in economies of money charges.

Accordingly the present invention contemplates the preparation of a novel formulation useful for the removal of coatings and finishes such as paints, varnishes, lacquers, shellacs, gums, natural and synthetic resins, and the like which includes a methylene chloride-methanol organic solvent mixture, the latter being present in significant proportion such as to make the use of the solvent economically attractive while still attaining the results at least equivalent to the use of methylene chloride individually, a quaternary nitrogen-containing cellulose ether thickener as hereinafter defined and a compound selected from the group consisting of calcium oxide, sodium hydroxide, monoethanolamine, chromium sulfate, copper chloride, barium chloride, lithium sulfate, lithium chloride, and sodium chloride. In addition, the novel formulation can include one or more conventional ingredients which are oftentimes employed to vary the characteristics of coating remover formulations such as, for example, wetting agent, e.g., sodium sulfate derivatives of 3,9-diethyltridecane-6-ol; emulsifying agent, for example, alkyl phenyl polyethylene glycol ether; activator, for example, triethanolamine; water; penetrant, for example, creosote; filler, for example, ground wood, powdered calcium carbonate; and the like.

The quaternary nitrogen containing cellulose ethers contemplated as the viscosity thickening component in the novel surface coating removal formulations of this invention are polymers having a backbone of anhydroglucose units with pendant substituent groups bearing a full positive charge spaced along the backbone. The cellulose ethers are polymers of the structural formula:

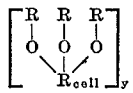

wherein $R_{cell}$ is the residue of an anhydroglucose unit, $y$ is an integer having a value of from about 50 to about 20,000, and each R individually represents a substituent group of the general formula:

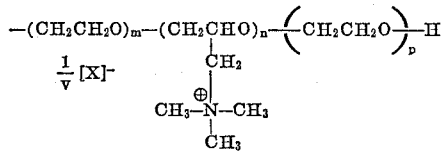

wherein $m$ is an integer having a value of from zero to 10; $n$ is a integer having a value of from zero to 10; $x$ is an anion; $v$ is an integer which is equal to the valence of $x$; the average value of $n$ per anhydroglucose unit of said cellulose ether is from about .02 to about 1; and the average value of $m+p$ per anhydroglucose unit of said cellulose ether is from about 0.5 to about 4.

The preparation of these quaternary nitrogen-containing cellulose ethers is fully described in U.S. Pat. 3,472,840, issued Oct. 14, 1969; and is incorporated herein by reference.

Generally however, the cellulosic ethers of the present invention can be prepared by reacting a suitable trimethyl ammonium chlorohydrin such as represented by the structural formula:

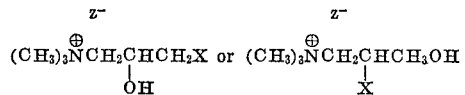

wherein X is halogen and $z^-$ equals any anion, or the corresponding glycidyl trimethyl ammonium salts, with hydroxyl ethyl cellulose.

Alternately, however, the above quaternary compounds can first be reacted with cellulose and these products further reacted with ethylene oxide. In still another technique, the cellulose can be reacted with the ethylene oxide and the quaternary compounds simultaneously to produce the desired products.

Preferably, the reaction is conducted in an alkaline medium as is conventional in the art for producing cellulose ethers.

Temperature can be varied over a wide range such as from 5° to 100° C. or higher. These ethers have poor solubility in most organic liquids and mixtures of liquids. Methylene chloride is not a solvent or swelling agent for these ethers. However, the ethers described above can be made to dissolve in mixtures of methylene chloride and methanol, thus satisfying the requirement that the thickening agent be soluble in the organic solvent.

An important feature of the present invention is that the surface coating remover provides excellent results without the aid of evaporation retardants or film-forming compounds. Thus, there is no need to include in the formulation evaporation retardants, such as paraffin wax, montan or ceresin wax, crude scale wax, bees' wax, and other like film-forming compounds.

For optimum results, the concentration of the components comprising the surface coating removal formulation will be governed by several considerations such as the composition of the surface coating to be removed, the position of the surface coating to be removed, the position of the surface coating, that is, whether on an incline or horizontal surface, and other factors. As a general rule, the concentration of the quaternary nitrogen containing cellulose ethers in the formulation should be sufficient to impart increased viscosity to the formulation and in this respect factors such as, for example, the means contemplated in applying the formulation to the surface coating and ratio of methylene chloride to methanol employed, will play a role in determining the ultimate concentration of this ingredient. The optimum ratio for the methylene chloride-methanol solvent comprising the surface coating removal formulation is generally within the range of about 4 to 1.5. Broadly, the surface coating removal formulation can comprise from about 99.5 to 90 parts by weight of methylene chloride-methanol solvent, and from about .5 to 10 parts by weight of quaternary nitrogen containing cellulose ether. Without the addition of the compounds of the present invention, it is preferred that the removal formulation comprise from about 99 to 96 parts by weight of methanol-methylene chloride solvent, and from about 1 to 4 parts by weight of quaternary nitrogen containing celulose ether. However, by utilization of the compounds of the present invention, the amount of quaternary nitrogen containing cellulose ether (thickener) can be reduced substantially while still providing a thickened system comparable with greater concentrations of thickener. Thus, there can be utilized from about .25 to about 5 parts thickener and from about .25 to about 5 parts of the compounds of the present invention to attain results at least comparative to or in some cases superior to the employment of 5 to 10 parts thickener respectively.

As mentioned previously the compounds of the present invention can be employed as aqueous solutions or as solids. They are incorporated subsequent to the mixing of the methylene chloride-methanol, and thickener.

Although an evaporation retardant is not essential as an ingredient of the formulation of the present invention it may, however, be included without producing detrimental effects and indeed in some cases an evaporation retardant may be useful.

The following examples illustrate the invention.

EXAMPLE 1

Preparation of cellulose ether

A quaternary nitrogen containing cellulose ether wherein the average value per anhydroglucose unit of $n=0.19$ and the average value per anhydroglucose unit of $m+p=1.48$ in the generic formula heretofore indicated was prepared by reaction of an agitated slurry of 22.6 parts cellulose (cotton linters) in an isopropanol-water medium containing 15.70 parts, 50% aqueous sodium hydroxide with 43.52 parts, 70% aqueous 3-chloro-2-hydroxypropyltrimethyl ammonium chloride and thereafter further reacting the slurry with 21.3 parts ethylene oxide in the presence of an additional 18.70 parts of 50% aqueous sodium hydroxide. The reaction product was neutralized with acetic acid, recovered and dried.

EXAMPLE 2

One gram of the cellulose ether produced as in Example I was suspended in a homogeneous mixture comprised of methylene chloride (35 cc.) and methanol (15 cc.). The resin began to swell immediately, but slowly. After a three hour period at 25° C. swelling and dissolution had taken place to such an extent that the mass was mushy.

The mush was spread readily with a spatula on a three-month old alkyd resin surface coating. The paint began to "lift" in a matter of seconds, and loosened completely in a few minutes. The loose paint was scraped off readily. The exposed metal surface was brushed well, wiped dry with a clean cloth and the surface was then deemed ready for recoating. After 20 hours at ambient temperatures the unused "mush" had turned to a medium-heavy gel which could be knifed onto any adaptable surface. When this system was knifed onto a three month old alkyd resin surface, the surface began to lift in 10–12 seconds and was ready for scraping in five minutes.

EXAMPLE 3

This example demonstrates hw the addition of a small increment of 50 percent aqueous sodium hydroxide has the ability to substantially thicken the mush formed in Example 2 immediately after formation of the mush.

To 25 grams of the slush or mush formed in Example 2, there is added 0.2 cc's. of 50% aqueous sodium hydroxide. The addition was made at room temperature while the slush was being stirred. The system gelled after the sodium hydroxide had been added thereby producing a paint remover which could be spread on a painted surface and allowed to stand until the paint has lifted. The quantity of hydroxy cellulose thickener in Example 2 when reduced by 50 percent in the mush or slush produced a product which maintained its viscosity to an acceptable level when 0.2 cc's. of 50% sodium hydroxide was added.

EXAMPLE 4

A quaternary cellulose ether was prepared according to the procedure described in Example 1 wherein the average values per anhydroglucose unit of $n$ and $m+p$ was as follows:

$n = 0.33$
$m+p = 1.76$

One gram of the cellulose ether was suspended in a solution comprising 30 cc. of methylene chloride and 20 cc. of methanol. After a three hour period of waiting, the whole mixture had become a mush capable of being employed as a paint or other surface coating remover. After a 20 hour period at ambient temperatures, the mush spontaneously had changed to a thin gel. When brushed upon a surface which had been coated many months before with a polyvinyl acetate latex paint, the paint began to crinkle and lift within five seconds. It dissolved in one minute and could be scraped off readily.

EXAMPLE 5

This example demonstrates how the addition of a small increment of calcium oxide has the ability to substantially thicken the mush formed in Example 4 immediately after formation of the mush.

To 25 grams of the slush or mush formed in Example 2, there is added 0.6 cc.'s of 50% aqueous sodium hydroxide. The addition was made at room temperature while the slush was being stirred. The system gelled after the calcium oxide had been added thereby producing a paint remover which could be spread on a painted surface and allowed to stand until the paint has lifted. The quantity of hydroxy cellulose thickener in Example 4 when reduced by 50 percent produced a product which maintained its viscosity to an acceptable level when 0.6 cc.'s of calcium oxide was added.

EXAMPLES 6–13

These examples demonstrate the further thickening powers of the indicated compounds when added to the paint remover system. The compounds were added to the product of Examples 1 and 2 and were added in a manner as described in Example 3. The quantities added and results are indicated in Table 1.

TABLE 1

| Ex. | Additive | Amount | Remarks |
|---|---|---|---|
| 1 | Monoethanolamine | 10 cc | Gelled. |
| 7 | Sodium metasilicate | 1. gram | Thin gel. |
| 8 | Cr₂(SO₄)₃ (aqueous) | 0.4 cc | Do. |
| 9 | Copper chloride 10% (aq.) | 0.3 cc | Improved thickening. |
| 10 | Barium chloride 33% (aq.) | 0.6 cc | Thick smooth paste. |
| 11 | Lithium sulfate | 2.0 grams | Gelled. |
| 12 | Lithium chloride | do | Smooth flowing gel. |
| 63 | Sodium chloride | 5.0 grams | Thin gel. |

As will be seen from the above, the addition of select compounds to a paint remover system comprising methylene chloride, methanol and a quaternary cellulose ether (as thickening agent) has the ability to further thicken the system. This has the advantage of producing a more substantial product at a given concentration of quaternary cellulose ether or that a product equivalent in viscosity rating and consistency to that system can be formed with substantially lower concentration of thickener.

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A paint remover composition consisting essentially of methylene chloride, methanol, a quaternary nitrogen cellulose ether of the formula:

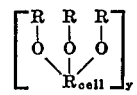

wherein $R_{cell}$ is the residue of an anhydroglucose unit, $y$ is an integer having a value of from about 50 to about 20,000 and each R individually represents a substituent group of the general formula:

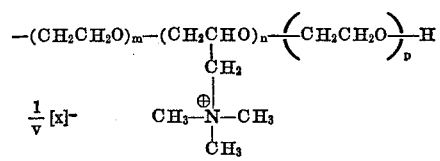

wherein $m$ is an integer having a value of from zero to 10; $n$ is an integer having a value of from zero to 3; $p$ is an integer having a value of from zero to 10; $x$ is an anion; $v$ is an integer which is equal to the valence of $x$; the average value of $n$ per anhydroglucose unit of said cellulose ether is from about .02 to about 1; and the average of $m+p$ per anhydroglucose unit of said cellulose ether is from about 0.5 to about 4; and a gelling compound selected from the group consisting of calcium oxide, sodium hydroxide, monoethanolamine, chromium sulfate, copper chloride, sodium meta-silicate, barium chloride, lithium sulfate, lithium chloride and sodium chloride and wherein the cellulose ether is present in said composition in an amount of 0.25 to 5% by weight and said gelling compound is present in an amount of 0.25 to 5% by weight.

2. A paint remover composition according to claim 1 wherein the volume ratio of methylene chloride to methanol is within the range of about 4 to about 1.5.

3. A paint remover composition according to claim 1 wherein the average value of $n$ per anhydroglucose unit is from about 0.02 to about 0.50 and the average value of $m+p$ per anhydroglucose unit is from about 1.4 to about 2.5.

4. A paint remover composition according to claim 1 wherein said compound is an aqueous solution of sodium hydroxide.

5. A paint remover composition according to claim 1 wherein said compound is calcium oxide.

6. A paint remover composition according to claim 1 wherein said compound is monoethanolamine.

7. A paint remover composition according to claim 1 wherein said compound is sodium metasilicate.

References Cited

UNITED STATES PATENTS

| | | | |
|---|---|---|---|
| 2,507,984 | 5/1950 | Kuentzel | 252—172 |
| 3,075,023 | 1/1963 | Berst et al. | 252—172 |
| 3,179,609 | 4/1965 | Morison | 252—172 |
| 1,189,804 | 7/1916 | Ellis | 252—DIG 8 |
| 1,449,388 | 3/1923 | Ferrell | 252—DIG 8 |
| 2,433,517 | 12/1947 | Kuentzel | 252—DIG 8 |
| 2,479,629 | 8/1949 | Kuentzel | 252—DIG 8 |
| 3,060,126 | 10/1962 | Gerard et al. | 252—DIG 8 |
| 3,094,491 | 6/1963 | Greminger et al. | 252—171 |
| 3,472,840 | 10/1969 | Stone et al. | 260—231 |

LEON D. ROSDOL, Primary Examiner

W. E. SCHULZ, Assistant Examiner

U.S. Cl. X.R.

134—38; 252—171, 172